United States Patent [19]
Fischer et al.

[11] 3,878,149
[45] Apr. 15, 1975

[54] STABILIZED POLYOLEFIN IN MOLDING MATERIALS

[75] Inventors: Roman Fischer, Mutterstadt; Gernot Teege, Ludwigshafen; Werner Fliege, Otterstadt; Wolfgang Koernig, Mannheim, all of Germany

[73] Assignee: Basf Aktiengesellschaft, Ludwigshafen/Rhine, Germany

[30] Foreign Application Priority Data

Feb. 24, 1973    Germany..........................2309431

[22] Filed: Feb. 19, 1974

[21] Appl. No.: 443,823

[52] U.S. Cl. 260/23 H; 260/45.85 R; 260/45.9 AD; 260/45.9 NC
[51] Int. Cl.................. C08f 45/60; C08f 45/58
[58] Field of Search............ 260/45.85 R, 45.9 AD, 260/45.9 NC, 23 H

[56] References Cited
UNITED STATES PATENTS

| | | | |
|---|---|---|---|
| 3,433,835 | 3/1969 | Müller | 260/45.9 |
| 3,457,328 | 7/1969 | Blatz et al. | 260/45.9 |

*Primary Examiner*—V. P. Hoke
*Attorney, Agent, or Firm*—Johnston, Keil, Thompson & Shurtleff

[57] ABSTRACT

Stabilized polyolefin molding materials comprising:- (1) a polyolefin; (2) a stabilizer; and optionally (3) one or more conventional other auxiliaries or additives and containing certain 4-(m,m'-ditert.-butyl-p-hydroxyphenyl)-butyl- (2) compounds as stabilizers. The polyolefins exhibit better stability than prior art stabilized polyolefins.

3 Claims, No Drawings

STABILIZED POLYOLEFIN IN MOLDING MATERIALS

The present invention relates to stabilized polyolefin molding material comprising (1) a polyolefin; (2) from 0.05 to 3% by weight (based on the polyolefin) of a stabilizer; and optionally in addition (3) one or more than one conventional auxiliary and/or additive in a conventional amount.

Molding materials of the said type are known in a number of variants. The stabilizer in them serves to protect the polyolefin from damaging external influences, mainly to protect it from attack by light, heat and/or oxygen (air). Important requirements are placed on the stabilizers. For example, their effect should be as wide as possible, i.e., they should stabilize against as many damaging influences as possible. Moreover they should have the longest possible life and should be as compatible as possible with the polyolefin concerned (for example it should not diffuse out from the same). Furthermore they should have the least detrimental effect possible on the desirable properties of the polyolefin. One of the more frequent requirements is that they must not involve any health hazards. Finally the stabilizers should be economical, i.e., easily accessible, easy to handle and effective in small amounts.

Prior art stabilizers fall short of the requirements placed on them in one way or another, often because a useful property is accompanied by an undesired property.

The object of the present invention is therefore to provide stabilized polyolefin molding material showing superior properties.

We have found that this object is achieved by polyolefin molding material containing certain 4-($m,m'$-ditert.-butyl-$p$-hydroxyphenyl)-butyl-(2) compounds as stabilizers.

In accordance with the present invention a stabilized polyolefin molding material comprises:
1. a polyolefin;
2. from 0.05 to 3% and preferably from 0.05 to 0.3% by weight (based on the polyolefin) of a stabilizer and optionally in addition
3. one or more conventional other auxiliaries and/or additives.

The molding material according to the invention is characterized in that it contains as stabilizer a 4-($m,m'$-ditert.-butyl-$p$-hydroxy-phenyl)-butyl-(2) compound of the formula (I):

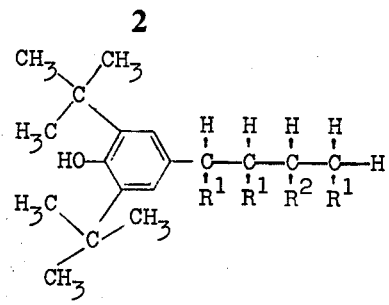
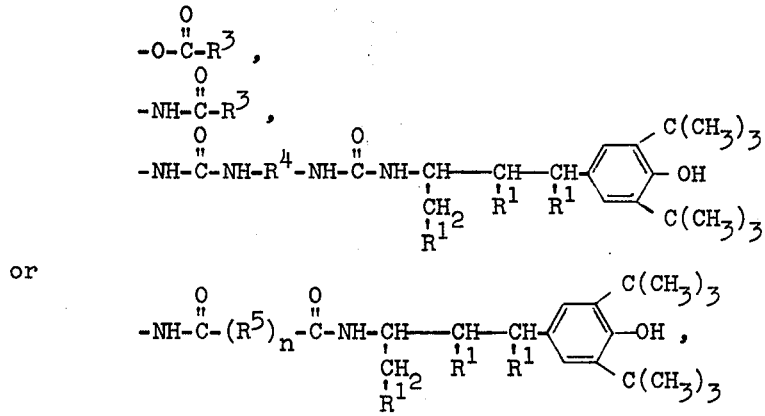

in which
$R^1$ (identical or different) is hydrogen or $C_1$- to $C_4$-Alkyl;
$R^2$ is where $R^3$, $R^4$ and $R^5$ (identical or different) are each a $C_1$ to $C_{18}$ hydrocarbon radical; and
$n$ is zero or 1.

Preferred molding materials according to the invention are characterized in that they contain as a stabilizer a 4-($m,m'$-ditert.-butyl-$p$-hydroxyphenyl)-butyl-(2) compound of the formula (II):

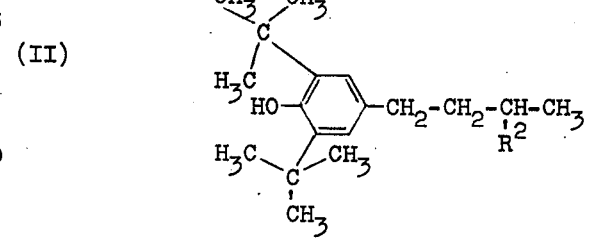

in which
$R^2$ is

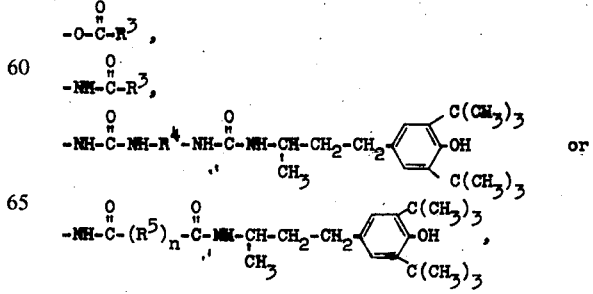

where $R^3$, $R^4$ and $R^5$ (identical or different) is each a $C_1$ to $C_{18}$ hydrocarbon; and $n$ is zero or 1.

Outstanding molding material according to the invention is characterized by containing as a stabilizer a 4-($m,m'$-ditert.-butyl-$p$-hydroxyphenyl)-butyl-(2) compound of the formula (II)

(II)
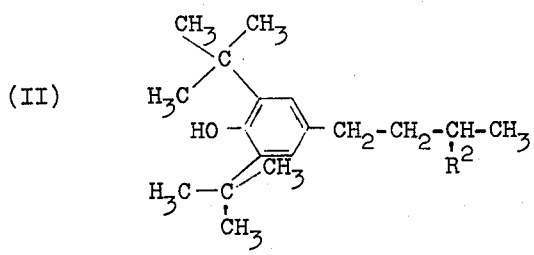

in which
$R^2$ is

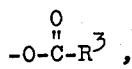,

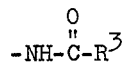

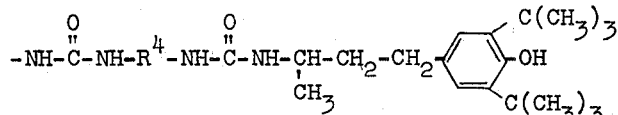

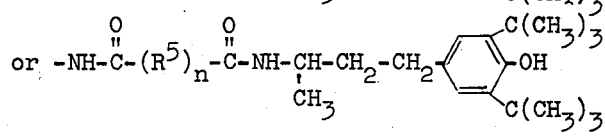

where $R^3$ is a $C_1$ to $C_{18}$ hydrocarbon radical;
$R^4$ is a $C_1$ to $C_6$ hydrocarbon radical;
$R^5$ is a $C_1$ to $C_{14}$ hydrocarbon radical; and
$n$ is 1.

The molding material may contain the above specified 4-($m,m'$-ditert.-butyl-$p$-hydroxyphenyl)-butyl-(2) compound in the form of an individual substance or a mixture of individual substances.

It may said generally concerning the stabilizers which characterize the present invention that they may be prepared by conventional methods for the synthesis of esters, monoamides, bisureas and bisamides.

In particular the following methods may be referred to:

a. for the production of the esters of the formula (III):

(III)
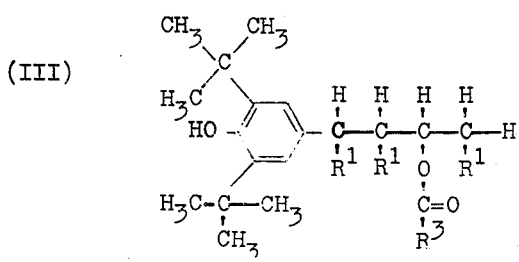

it is advantageous to react a 4-($m,m'$-ditert.-butyl-$p$-hydroxyphenyl)-butan-2-ol of the formula (IV):

(IV)
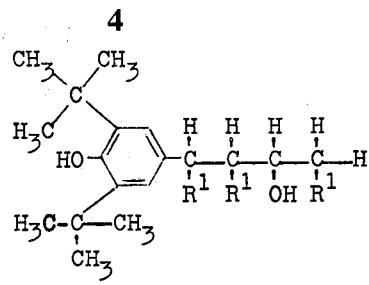

with a carboxylic acid or an ester-forming derivative of a carboxylic acid of the formula (V):

(V) 

Examples of starting materials (IV) suitable for the production of the esters are:

4-($m,m'$-ditert.-butyl-$p$-hydroxyphenyl)-butan-2-ol, 4-methyl-4-($m,m'$-ditert.-butyl-$p$-hydroxyphenyl)-butan-2-ol, 3-ethyl-4-($m,m'$-ditert.-butyl-$p$-hydroxyphenyl)-butan-2-ol, 1-ethyl-4-($m,m'$-ditert.-butyl-$p$-hydroxyphenyl)-butan-2-ol, 1,4-dimethyl-4-($m,m'$-ditert.-butyl-$p$-hydroxyphenyl)-butan-2-ol, and 1,3,4-trimethyl-4-($m,m'$-ditert.-butyl-$p$-hydroxyphenyl)-butan-2-ol.

Examples of suitable starting materials (V) are the following carboxylic acids (or their halides or anhydrides): formic acid, acetic acid, butyric acid, palmitic acid, stearic acid, benzoic acid, cyclohexanoic acid, phenylacetic acid, naphthalene-1-carboxylic acid, naphthalene-2-carboxylic acid, p-toluic acid, propionic acid, isobutyric acid, caprylic acid, caproic acid, lauric acid and valeric acid.

b. For the production of monoamides of the formula (VI):

(VI) 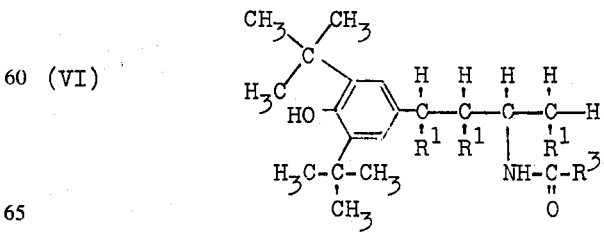

and the bisamides of the formula (VII):

(VII) 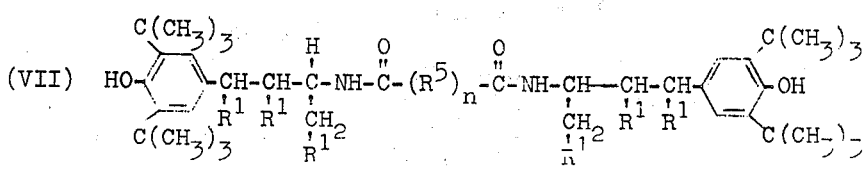 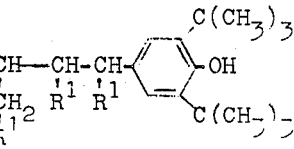

it may be convenient to start from a 2-amino-4-(*m,m'*-ditert.-butyl-*p*-hydroxyphenyl)-butane of the formula (VIII):

(VIII) 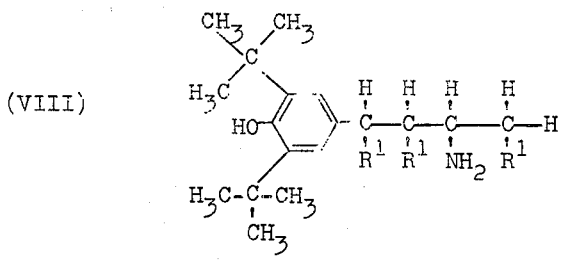

Examples of suitable starting materials (VIII) are:
2-amino-4-(*m,m'*-ditert.-butyl-*p*-hydroxyphenyl)-butane,
4-methyl-4-(*m,m'*-ditert.-butyl-*p*-hydroxyphenyl)-butane,
3-ethyl-4-(*m,m'*-ditert.-butyl-*p*-hydroxyphenyl)-butane,
1-ethyl-4-(*m,m'*-ditert.-butyl-*p*-hydroxyphenyl)-butane,
1,4-dimethyl-4-(*m,m'*-ditert.-butyl-*p*-hydroxyphenyl)-butane
and 1,3,4-trimethyl-4-(*m,m'*-ditert.-butyl-*p*-hydroxyphenyl)-butane.

Chlorides or anhydrides of the carboxylic acids specified under (a) are for example suitable for conversion of starting materials (VIII) into monoamides (VI). Conversion of starting materials (VIII) into bisamides (VII) may be carried out for example with halides and anhydrides of the following dicarboxylic acids: oxalic acid, malonic acid, succinic acid, glutaric acid, adipic acid, pimelic acid, sebacic acid, decane dicarboxylic acid, terephthalic acid, cyclohexane-1,4-dicarboxylic acid, cyclohexane-1,2-dicarboxylic acid, cyclohexane-1,3-dicarboxylic acid, naphthalene-1,4-dicarboxylic acid, naphthalene-1,8-dicarboxylic acid, isophthalic acid, phthalic acid, diphenylmethane-4,4'-dicarboxylic acid, 4-(*p*-carboxybenzyl)-cyclohexanoic acid, tetrahydronaphthalene-1,8-dicarboxylic acid, tetrahydronaphthalene-1,5-dicarboxylic acid, decahydronaphthalene-1,8-dicarboxylic acid, decahydronaphthalene-1,5-dicarboxylic acid, p-(1-carboxypropyl)-(2)-benzoic acid, p-(carboxymethyl)-benzoic acid and p-(carboxymethyl)-phenylacetic acid.

c. For the production of bisureas of the formula (IX):

(IX) 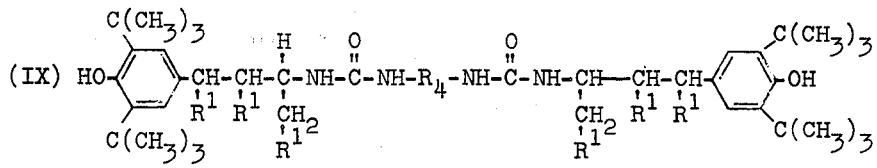 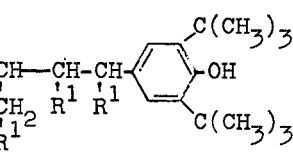

it is convenient to start from a 2-amino-4-(*m,m'*-ditert.-butyl-*p*-hydroxyphenyl)-butane (VIII) as specified under (b) and a diisocyanate of the formula (X)

$$OCN—R^4—NCO. \quad (x)$$

Examples of suitable diisocyanates of this type are 1,4-butane diisocyanate, 1,6-hexane diisocyanate, *p*-phenylene diisocyanate, 2,4-toluylene diisocyanate, 2,5-toluylene diisocyanate, 2,6-toluylene diisocyanate, 1,5-naphthylene diisocyanate, 1,8-naphthylene diisocyanate, 4,4-diphenylmethane diisocyante, 3,3'-dimethyl-4,4'-diphenyl diisocyanate, 1,3-propane diisocyanate, 1,3-cyclohexylene diisocyanate, 1,4-cyclohexylene diisocyanate, *m*-phenylene diisocyanate, tetrahydronaphthalene-1,5 diisocyanate, tetrahydronaphthalene-1,8 diisocyanate, decahydronaphthalene-1,5 diisocyanate, decahydronaphthalene-1,8 diisocyanate, 4-(isocyanatobenzyl)-cyclohexane isocyanate, *p*-isocyanatocumyl isocyanate, *p*-isocyanatobenzyl isocyanate and *p*-isocyanatophenylethyl isocyanate.

The abovementioned 4-(*m,m'*-ditert.-butyl-*p*-hydroxyphenyl)-butyl-(2) compounds (to which no claim is made herein) are used as stabilizers in polyolefin molding materials in accordance with the invention. The polyolefins forming the bases of such molding materials may be those conventionally used in the plastics industry, i.e., mainly homopolymers and copolymers of $C_2$ to $C_6$ α-olefins. It has been found that the stabilizers are very suitable for stabilizing homopolymers and copolymers of ethylene and copolymers of propylene but above all for stabilizing homopolymers of propylene (polypropylene). If desired the molding materials according to the invention may contain (in addition to the said stabilizers) conventional other auxiliaries or additives in conventional amounts, for example other stabilizers, lubricants, clarifying agents, colorants, fireretarding substances and powdery or fibrous fillers and reinforcing materials. Such substances are however not characteristic of the present invention.

Production of the polyolefin molding materials from the components may be carried out in a simple manner as additives are conventionally incorporated into polyolefins, as homogeneously as possible, for example by rolling or extrusion.

Molding the material into shaped articles may also be carried out with the apparatus and methods conventionally used for the polyolefins concerned.

The following Examples illustrate the invention.

EXAMPLE 1

Starting material:
A polypropylene molding material containing:
1. a polypropylene having an intrinsic visosity [η] (measured in decahydronaphthalene at 130°C) of 2.5 dl/g and a fraction soluble in boiling n-heptane of 15% by weight; and
2. 0.2% by weight (based on the polypropylene) of a stabilizer which is the palmitic acid amide of 4-(*m,m'*-ditert.-butyl-*p*-hydroxyphenyl)-2-aminobutane.

Apparatus used:
A conventional apparatus for the production of blown film.

Method:

A blown film is produced by extruding the molding material through a ring nozzle as a primary tubing having a wall thickness of 0.07 mm (temperature of the molding materials during extrusion 210°C), the tubing is inflated to 1.5 times its original internal diameter and thus cooled to a temperature of 50°C at a draw-off speed of 12 meters per second.

The blown film obtained in this way has good properties and particularly a very good stabilization against heat, light and atmospheric oxygen.

EXAMPLE 2

Starting material:
A polypropylene molding material containing:
1. a polypropylene as in Example 1 but having a fraction soluble in boiling n-heptane of 3% by weight; and
2. 0.2% by weight (based on the polypropylene) of the ethylhexanoic acid amide of 4-(*m,m'*-ditert.-butyl-*p*-hydroxyphenyl)-2-aminobutane.

Apparatus used:
A conventional apparatus for the production of injection moldings (screw injection machine with 400 g maximum injection weight, 300 megapond clamping force and 1,600 kg/cm² maximum theoretical injection pressure).

Method:
Rectangular open containers (width 60 mm, length 120 mm and height 40 mm) are produced on the screw injection machine.

Operating conditions:
temperature of the melt: 250°C;
cycle time: sixty seconds;
temperature of cooling medium (water): 30°C;
temperature on removal from mold: such that no deformation of the molding takes place.

In this way moldings are obtained having a good stabilization not to be achieved with the same polypropylene and prior art stabilizers under otherwise identical conditions.

EXAMPLE 3

Starting material:
A polypropylene molding material containing:
1. a polypropylene as in Example 1; and
2. 0.2% by weight (based on the polypropylene) of the lauric acid amide of 4-(*m,m'*-ditert.-butyl-*p*-hydroxyphenyl)-2-aminobutane.

Method:
The procedure described in Example 2 is adopted.
Moldings having good properties and particularly a very good stabilization are obtained.

EXAMPLE 4

Starting material:
A polypropylene molding material containing:
1. A polypropylene as in Example 1 but having a fraction soluble in boiling n-heptane of 3% by weight; and
2. 0.2% by weight (based on the polypropylene) of the stearic acid amide of 4-(*m,m'*-ditert.-butyl-*p*-hydroxyphenyl)-2-aminobutane.

Method:
The procedure described in Example 1 is adopted.
In this way film is obtained with a good stabilization such as cannot be achieved with the same polypropylene and prior art stabilizers under otherwise identical conditions.

We claim:

1. A stabilized polyolefin molding material comprising:
   1. a polyolefin; and
   2. from 0.05 to 3% by weight based on the polyolefin of a stabilizer

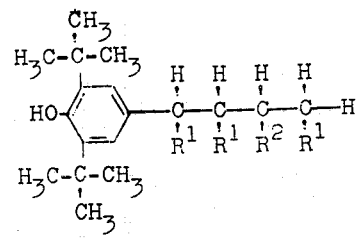

in which
$R^1$ identical or different is hydrogen or $C_1$ to $C_4$-alkyl;
$R^2$ is

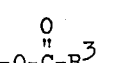

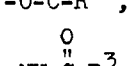

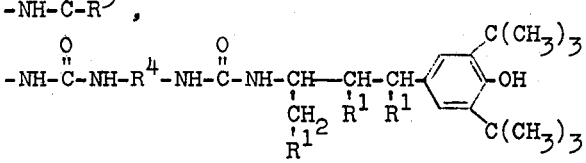

or

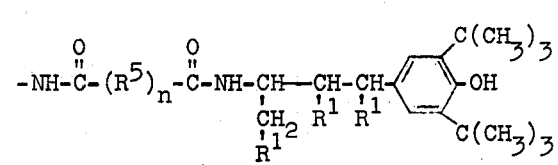

where $R^3$ is a $C_1$ to $C_{18}$ hydrocarbon radical;
$R^4$ is a $C_1$ to $C_{18}$ hydrocarbon radical;
$R^5$ is a $C_1$ to $C_{18}$ hydrocarbon radical; and
$n$ is zero or 1.

2. A stabilized polyolefin molding material comprising:
   1. a polyolefin; and
   2. from 0.05 to 3% by weight based on the polyolefin of a stabilizer

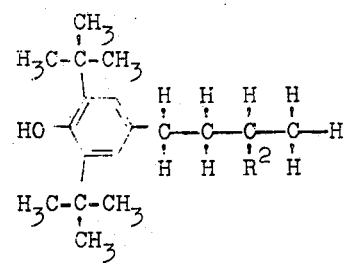

in which R² is
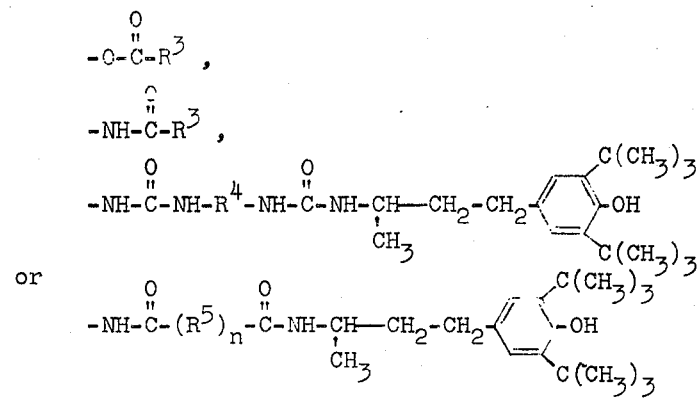
where R³ is a C₁ to C₁₈ hydrocarbon radical;
R⁴ is a C₁ to C₁₈ hydrocarbon radical;
R⁵ is a C₁ to C₁₈ hydrocarbon radical;
$n$ is zero or 1.
3. A stabilized polyolefin molding material as claimed in claim 1 in which in the formula R⁴ is a C₁ to C₆ hydrocarbon radical;
R⁵ is a C₁ to C₁₄ hydrocarbon radical; and $n$ is 1.
* * * * *